United States Patent
Taoka et al.

(10) Patent No.: US 8,964,671 B2
(45) Date of Patent: Feb. 24, 2015

(54) USER APPARATUS, BASE STATION APPARATUS AND METHOD IN MOBILE COMMUNICATIONS SYSTEM

(75) Inventors: Hidekazu Taoka, Tokyo (JP); Mamoru Sawahashi, Yokohama (JP); Nobuhiko Miki, Yokohama (JP)

(73) Assignee: NTT DOCOMO, INC., Tokyo (JP)

(*) Notice: Subject to any disclaimer, the term of this patent is extended or adjusted under 35 U.S.C. 154(b) by 110 days.

(21) Appl. No.: 13/526,072

(22) Filed: Jun. 18, 2012

(65) Prior Publication Data

US 2012/0257592 A1   Oct. 11, 2012

Related U.S. Application Data

(62) Division of application No. 12/680,594, filed as application No. PCT/JP2008/067519 on Sep. 26, 2008, now Pat. No. 8,406,184.

(30) Foreign Application Priority Data

Oct. 1, 2007   (JP) .................................. 2007-258109

(51) Int. Cl.
*H04W 4/00* (2009.01)
*H04L 1/00* (2006.01)
*H04L 1/06* (2006.01)

(52) U.S. Cl.
CPC ................ *H04L 1/0073* (2013.01); *H04L 1/06* (2013.01)
USPC ............ 370/329; 370/338; 370/341; 370/348

(58) Field of Classification Search
CPC ..................................................... H04L 1/0073
USPC .......... 370/329, 338, 341, 347, 348; 375/260, 375/267, 296; 455/452.2
See application file for complete search history.

(56) References Cited

U.S. PATENT DOCUMENTS

| | | | |
|---|---|---|---|
| 2004/0190484 A1* | 9/2004 | Shin et al. | 370/347 |
| 2007/0165738 A1* | 7/2007 | Barriac et al. | 375/267 |
| 2007/0260956 A1 | 11/2007 | Terry et al. | |

(Continued)

FOREIGN PATENT DOCUMENTS

EP        1780925 A2   5/2007

OTHER PUBLICATIONS

International Search Report with translation from PCT/JP2008/067519 dated Jan. 6, 2009 (4 pages).

(Continued)

*Primary Examiner* — Brian D Nguyen
*Assistant Examiner* — Toan Nguyen
(74) *Attorney, Agent, or Firm* — Osha Liang LLP

(57) ABSTRACT

A base station apparatus in a mobile communications system has a unit which transmits, to one or more user apparatuses, a downlink control signal including information for allocating a radio resource, a unit which receives an uplink signal from the one or more user apparatuses, and a unit which determines, based on a feedback from the user apparatus, a pre-encoding matrix indicator (PMI) indicating a pre-encoding matrix to be applied to multiple antennas of the base station apparatus. When a number of multiplexed users in the downlink control signal is no less than a predetermined number, the PMI indicating the pre-encoding matrix to be applied to a whole system bandwidth of the mobile communications system is reported to each of the user apparatuses.

3 Claims, 9 Drawing Sheets

(56) References Cited

U.S. PATENT DOCUMENTS

| | | | |
|---|---|---|---|
| 2008/0219370 A1* | 9/2008 | Onggosanusi et al. | 375/260 |
| 2008/0233902 A1 | 9/2008 | Pan et al. | |
| 2008/0268862 A1* | 10/2008 | Kent et al. | 455/452.2 |
| 2008/0273624 A1* | 11/2008 | Kent et al. | 375/296 |
| 2008/0310353 A1 | 12/2008 | Love et al. | |
| 2009/0006925 A1 | 1/2009 | Pan | |
| 2009/0059844 A1 | 3/2009 | Ko et al. | |

OTHER PUBLICATIONS

Written Opinion from PCT/JP2008/067519 dated Jan. 6, 2009 (3 pages).
3GPP TS 36.213 V8.0.0; "Evolved Universal Terrestrial Radio Access (E-ULTRA); Physical layer procedures"; Sep. 2007 (13 pages).
3GPP TSG RAN1#49bis, R1-072707; "CQI/PMI PUCCH Management"; Motorola; Orlando, USA; Jun. 25-29, 2007 (3 pages).
3GPP TSG RAN WG1 Meeting #48, R1-071228; "LTE MIMO AH Summary"; AH Chairman; St. Louis, USA; Feb. 12-16, 2007 (8 pages).
3GPP TSG RAN WG1 Meeting #50, R1-073322; "UL physical channel for CQI report"; Sharp; Athens, Greece; Aug. 20-24, 2007 (3 pages).
3GPP TSG RAN1#50bis, R1-074001; "PMI Downlink Signaling and PDCCH Format"; Motorola; Shanghai, China; Oct. 8-12, 2007 (2 pages).
3GPP TR 25.814 V7.0.0; "Physical layer aspects for evolved Universal Terrestrial Radio Access (UTRA)"; Jun. 2006 (126 pages).
3GPP TSG RAN WG Meeting #47bis, R1-070103; "Downlink L1/L2 Control Signaling Channel Structure: Coding"; Jan. 15-19, 2007 (9 pages).
Russian Office Action for Application No. 2010115843/07, mailed on Jul. 11, 2012 (7 pages).
Ericsson et al., "Way Forward for CQI Reporting", 3GPP TSG-RAN WG1 Meeting #50, R1-073844, Athens, Greece, Aug. 20-24, 2007.
Office Action for U.S. Appl. No. 12/680,594 mailed Aug. 20, 2012 (5 pages).
Japanese Office Action for Application No. 2011-083142, mailed on Mar. 12, 2013 (5 pages).
Ericsson, "On CQI Reporting", 3GPP TSG-RAN WG1 Meeting #50; R1-073746; Athens, Greece; Aug. 20-24, 2007 (4 pages).
Motorola, "Way Forward for CQI Reporting Structure", R1-073766; RAN1#50, Athens, Greece; Aug. 20-24, 2007; (4 pages).
Motorola, "PDCCH Downlink format for precoding and non-precoding modes", 3GPP TSG RAN1 #50; R1-073389; Athens, Greece; Aug. 20-29, 2007 (3 pages).
Office Action in counterpart Korean Patent Application No. 10-2010-7007805, mailed Jul. 29, 2014 (7 pages).
Ericsson et al.; "Way forward for CQI reporting"; 3GPP TSG-RAN WG1 Meeting #50, R1-073858; Athens, Greece; Aug. 20-24 2007 (3 pages).
Philips; "Signalling for UL resource allocation"; 3GPP TSG RAN WG1 Meeting #50, R1-073723; Athens, Greece; Aug. 20-24, 2007 (2 pages).
Huawei; "DL control signaling to support MIMO"; TSG RAN WG1 meeting #50, R1-073511; Athens, Greece; Aug. 20-24, 2007 (5 pages).
Office Action dated Oct. 7, 2014 in related Japanese Application No. 2013-162009 (with translation) (5 pages).
3GPP TSG RAN WG1 50, R1-073423, "Design Aspects of UE Feedback", Texas Instruments, Athens, Greece, Aug. 20-24, 2007 (5 pages).
3GPP TSG RAN WG1 #50, R1-073491, "Frequency granularity of CQI and PMI feedback", LG Electronics, Athens, Greece, Aug. 20-24, 2007 (3 pages).
3GPP TSG RAN1 #50, R1-073378, "PMI Downlink Signaling and PDCCH Format", Motorola, Athens, Greece, Aug. 20-24, 2007 (3 pages).

* cited by examiner

USER APPARATUS, BASE STATION APPARATUS AND METHOD IN MOBILE COMMUNICATIONS SYSTEM

CROSS-REFERENCE TO RELATED APPLICATIONS

This is a divisional of U.S. patent application Ser. No. 12/680,594 filed on Mar. 29, 2010, now U.S. Pat. No. 8,406,184.

BACKGROUND OF THE INVENTION

1. Field of the Invention

The present invention generally relates to the technical field of mobile communications, and more particularly relates to base station apparatuses, user apparatuses and methods that conduct communications using multiple antennas.

2. Description of the Related Art

In this type of technical field, research and development related to next generation mobile communications schemes are being pushed forward at a fast pace. A W-CDMA standardization body, 3GPP, is studying a long term evolution (LTE) system as a communications scheme to succeed W-CDMA, HSPDA, or HSUDA. In the LTE, an OFDMA (orthogonal frequency division multiple access) scheme is planned for downlink, while an SC-FDMA (single-carrier frequency division multiple access) is planned for uplink as radio access schemes (see Non-patent document 1, for example).

The OFDMA is a scheme which divides a frequency band into multiple narrow frequency bands (sub-carriers) and overlays data onto the respective frequency bands to transmit the overlaid data. Densely lining up the sub-carriers such that they are in an orthogonal relationship with one another on the frequency axis makes it possible to achieve high-speed transmission and increase frequency utilization efficiency.

The SC-FDMA scheme is a single-carrier transmission scheme which divides a frequency bandwidth and conducts transmission using different frequency bands among multiple terminals to make it possible to reduce interference between the terminals. The SC-FDMA scheme reduces fluctuations in transmission power, which is advantageous in reducing power consumption of terminals and widening the coverage.

The LTE is a system which communicates with multiple user apparatuses sharing one or more physical channels for both uplink and downlink. The channels shared by the multiple user apparatuses as described above are generally called shared channels. In the LTE, in particular, uplink communication is conducted in a physical uplink shared channel (PUSCH) and downlink communication is conducted in a physical downlink shared channel (PDSCH).

In a communications system using these shared channels, it is necessary to signal, for each sub-frame (1 ms in the LTE), which user apparatus the shared channel is allocated to. In the LTE, a control channel used in the signaling is called a physical downlink control channel (PDCCH) or a DL-L1/L2 control channel (PDCCH). The physical downlink control channel information includes downlink scheduling information, acknowledgement information (ACK/NACK), an uplink scheduling grant, an overload indicator, a transmission power control command bit, etc. (see Non-patent document 2, for example).

The downlink scheduling information includes, for example, information on allocating a downlink resource block (RB) for a downlink shared channel, the ID of the UE, the number of streams when multi-input multi-output (MIMO) is conducted, information on a pre-encoding vector, information on a hybrid automatic repeat request (HARQ), a modulation scheme, a data size, etc. Moreover, the uplink scheduling information includes information on an uplink shared channel, e.g., information on allocating an uplink resource, an ID of an UE, information on uplink transmission power, the modulation scheme, the data size, information on a demodulation reference signal in uplink MIMO, etc.

The MIMO scheme is a multi-antenna communications scheme in which multiple antennas are used in communications to achieve an increased speed and/or quality of a transmission signal. Transmission signal streams are duplicated and the respective duplicated streams are mixed with appropriate weights to make it possible to send signals to communications counterparty in a directivity-controlled beam. This is called a pre-encoding scheme, while a weighting index (weight) to be used is called "a pre-encoding vector" or more generally "a pre-encoding matrix".

FIG. 1 schematically illustrates how the pre-encoding is performed. Two streams (transmit signals 1 and 2) are respectively duplicated at a duplicator into two sub-streams, in each of which sub-streams the pre-encoding vectors are multiplexed and combined, after which they are transmitted. From a viewpoint of utilizing a more appropriate pre-encoding matrix, it is preferably closed-loop pre-encoding as shown. In this case, based on a feedback from the receiver (a user apparatus), the pre-encoding matrix is adaptively controlled so as to take a more appropriate value. In the pre-encoding scheme, each stream is transmitted in a spatially different manner, so that a great advantageous effect in quality improvement for each stream may be expected. Moreover, from a viewpoint of achieving an improvement in throughput, taking into account a channel variation characteristic in the frequency-axis direction, not only applying one type of pre-encoding matrix to a whole system bandwidth, but also applying multiple pre-encoding matrices to one system bandwidth is being studied.

In an example shown in FIG. 2, one system bandwidth (for example, 10 MHz) is divided into four bandwidth regions, for each of which bandwidth regions a pre-encoding matrix is optimized. One bandwidth region may include a predetermined number (e.g., five) of resource blocks. One bandwidth may be about the same as a minimum system bandwidth such as 1.25 MHz, and may be wider or narrower than the minimum system bandwidth. Dividing a system bandwidth into a number of portions and applying a pre-encoding matrix to the respective divided bandwidth regions is described in Non-patent document 3, for example.

Non-patent document 1 3GPP TR 25.814 (V7.0.0), "Physical Layer Aspects for Evolved UTRA," June 2006

Non-patent document 2 R1-070103, Downlink L1/L2 Control Signaling Channel Structure Coding Non-patent document 3 R1-071228, 3GPP TSG RAN WG1 Meeting#48 St. Louis, USA, Feb. 12-16, 2007

SUMMARY OF THE INVENTION

Problem(s) to be Solved by the Invention

In order to properly demodulate a shared data channel pre-encoded, it is necessary to accurately perform channel compensation on the shared data channel. One method to perform this is to separately provide, on a dedicated basis, a dedicated reference signal which is pre-encoded in the same scheme as the shared data channel. Such a dedicated reference signal may indeed make it possible to accurately perform channel estimation. However, since resources for the dedicated reference signal which have to be provided on the dedicated basis are not small, the overhead ends up becoming unreasonably large. Therefore, this scheme is not desirable from a viewpoint of improving total system throughput.

In the meantime, there is a method of performing, based on a common reference signal which is common to all users, channel estimation in combination with information indicating which pre-encoding matrix is applied to the shared data channel to demodulate the shared data channel. For convenience of explanation, such pre-encoding matrix information is to be called a pre-encoding matrix indicator (PMI). The PMI, i.e., pre-encoding matrix, needs to be appropriately optimized according to channel fluctuations caused by a movement of a mobile station apparatus. A user apparatus frequently derives a PMI (pre-encoding matrix) suitable for an own apparatus, and feeds the derived PMI back to a base station apparatus. The base station apparatus updates a pre-encoding matrix to be applied to a downlink shared data channel, and uses the updated pre-encoding matrix to conduct the next transmission. Thereafter, feeding back of the PMI from the user apparatus and updating of the PMI at the base station apparatus are repeated.

The PMI fed back from the user apparatus may be erroneously received at the base station apparatus due to a radio propagating condition, or may, after reception, erroneously acknowledge the PMI. In this case, a non-optimal PMI ends up getting used in a next shared data channel transmission. However, the user apparatus does not know that the PMI has been erroneously acknowledged. Thus, the downlink shared data channel ends up getting processed in an inappropriately wasteful manner. One method to overcome this problem is for the base station apparatus to report each time the pre-encoding matrix to a user apparatus.

As illustrated in FIG. 3, according to the method as described above, the PMI applied to the channel as well a pre-encoded physical downlink shared channel are always transmitted to the user apparatus. Determining the PMI most suitable to the communications condition at the user apparatus UE and/or the base station apparatus eNB makes it possible to effectively utilize resources in downlink. For example, the user apparatus may determine an optimal PMI from a viewpoint of achieving a downlink quality improvement. Alternatively, for example, while a user apparatus UE transmits, to the base station apparatus eNB, a pre-encoding matrix on four streams, the pre-encoding matrix on two streams may suffice for downlink traffic. In this case, the base station apparatus eNB may provide the pre-encoding matrix on the two streams, and conduct communications using the same to effectively utilize resources without shortage or surplus.

However, the method shown in FIG. 3 requires always reporting the PMI in downlink, so that the overhead becomes large at least by a corresponding amount. Moreover, an amount of information occupied by the PMI increases or decreases with the number of users multiplexed in downlink, so that blind detection at the receiver is likely to become difficult. More specifically, when an attempt is made to divide a system bandwidth into multiple bandwidth regions, and to optimize a pre-encoding matrix for the respective regions, an amount of information of the PMI ends up increasing by a factor of the number of regions. Not only that, a size of the PMI provided for each user varies according to the number of bandwidth regions used (i.e., according to the bandwidth used in proportion to the whole bandwidth). This means that blind detection is needed at the receiver by the number of combinations of the number of bandwidth regions, which leads to a concern that a processing burden at the receiver ends up increasing.

As illustrated in FIG. 4, it is also possible to force the base station apparatus eNB to always follow the PMI fed back from the user apparatus UE. The PMI does not have to follow the downlink physical shared channel, so that this method makes it possible to save the overhead. However, in this way, the base station apparatus eNB ends up not being able to change the pre-encoding matrix to a more appropriate one, which is not preferable from a viewpoint of effectively utilizing resources. Moreover, if the PMI detected at the base station, apparatus eNB is erroneous, the base station apparatus ends up performing pre-encoding using a matrix different from what is expected by the user apparatus, so that the above problem of not being able to properly reconstruct the PDSCH may not be solved.

The problem to be solved by the present invention is to achieve a mobile communications system using a pre-encoding MIMO scheme that makes it possible for a user apparatus to accurately specify a pre-encoding matrix used in downlink data transmission, and that makes it possible to achieve increased efficiency in downlink signaling.

Means for Solving the Problem

In the present invention, a user apparatus in a mobile communications system is used. The user apparatus includes a unit which receives, from a base station apparatus, a downlink control signal including information for allocating a radio resource; a unit which determines, depending on a channel status, a pre-encoding matrix indicator (PMI) which indicates a pre-encoding matrix to be applied to multiple antennas of the base station apparatus; and a unit which transmits, to the base station apparatus, an uplink signal including the PMI. If a radio resource is allocated to a physical uplink shared channel of the user apparatus, the PMI is transmitted using a part of the radio resource. If the radio resource is not allocated to the physical uplink shared channel of the user apparatus, the PMI is transmitted in a physical uplink control channel which is allocated, in a fixed manner, to the user apparatus.

Advantage of the Invention

According to the present invention, a mobile communications system using a pre-encoding MIMO scheme makes it possible for a user apparatus to accurately specify a pre-encoding matrix to be used in downlink data transmission, and to achieve increased efficiency in downlink signaling.

DESCRIPTION OF THE PREFERRED EMBODIMENTS

[Description of Notations]

102 RF receiver; 104 uplink received signal demodulator; 106 data signal decoder; 108 control information decoder; 110 PMI accuracy determining unit; 112 pre-encoding matrix selector; 118 channel encoder; 120 control information modulator; 122 serial/parallel converter; 124 channel encoder; 126 data modulator; 128 pre-encoding matrix multiplier; 130 signal multiplexer; 132 inverse Fourier transformer; 134 RF transmitter; 202 data signal encoder and modulator; 204 control signal encoder and modulator; 206 uplink transmit signal generator; 208 RF transmitter; 210 RF receiver; 212 Fourier transformer; 214 pre-encoding matrix selector; 216 PMI accumulator; 218 control information demodulator; 220 channel decoder; 230 pre-encoding matrix multiplier; 232 signal separator; 234 channel decoder; 236 parallel/serial converter

[Best Mode of Carrying Out the Invention]

In an embodiment of the present invention, methods of feeding back a PMI differ depending on whether an uplink shared data channel PUSCH is allocated to a user apparatus.

The number of bits which can be transmitted in PUSCH is larger than the same in PUCCH. Then, if the shared data channel PUSCH resource is allocated, not only the PMI but also an error detection bit (a CRC bit) on information parts including the PMI is arranged to be reported to a base station apparatus in the PUSCH. As a result, the base station apparatus may accurately determine whether the feedback PMI has been received without error.

On the other hand, if the shared data channel PUSCH resource is not allocated to the user apparatus, the PMI is reported in the PUCCH. The number of bits which can be transmitted in the PUCCH is significantly less than the number of bits which can be transmitted in the PUSCH. Therefore, the CRC bit is not added and a pre-encoding matrix specified in the PMI reported in the PUCCH is restricted to a matrix applied to the whole system bandwidth. It is prohibited to specify multiple matrices that are applied to only a part of the system bandwidth. In this way, it is possible to effectively address a shortage of transmission bits of the PUCCH. As the CRC bit is not added, the base station apparatus cannot determine whether the feedback PMI could be successfully received. However, the PMI applied to a PDSCH by the base station apparatus is reported, together with the PDSCH, to the user apparatus as first indicator information PMI1, which makes it possible for the user apparatus to use the reported pre-encoding matrix to properly reconstruct the PDSCH.

Figure 5:
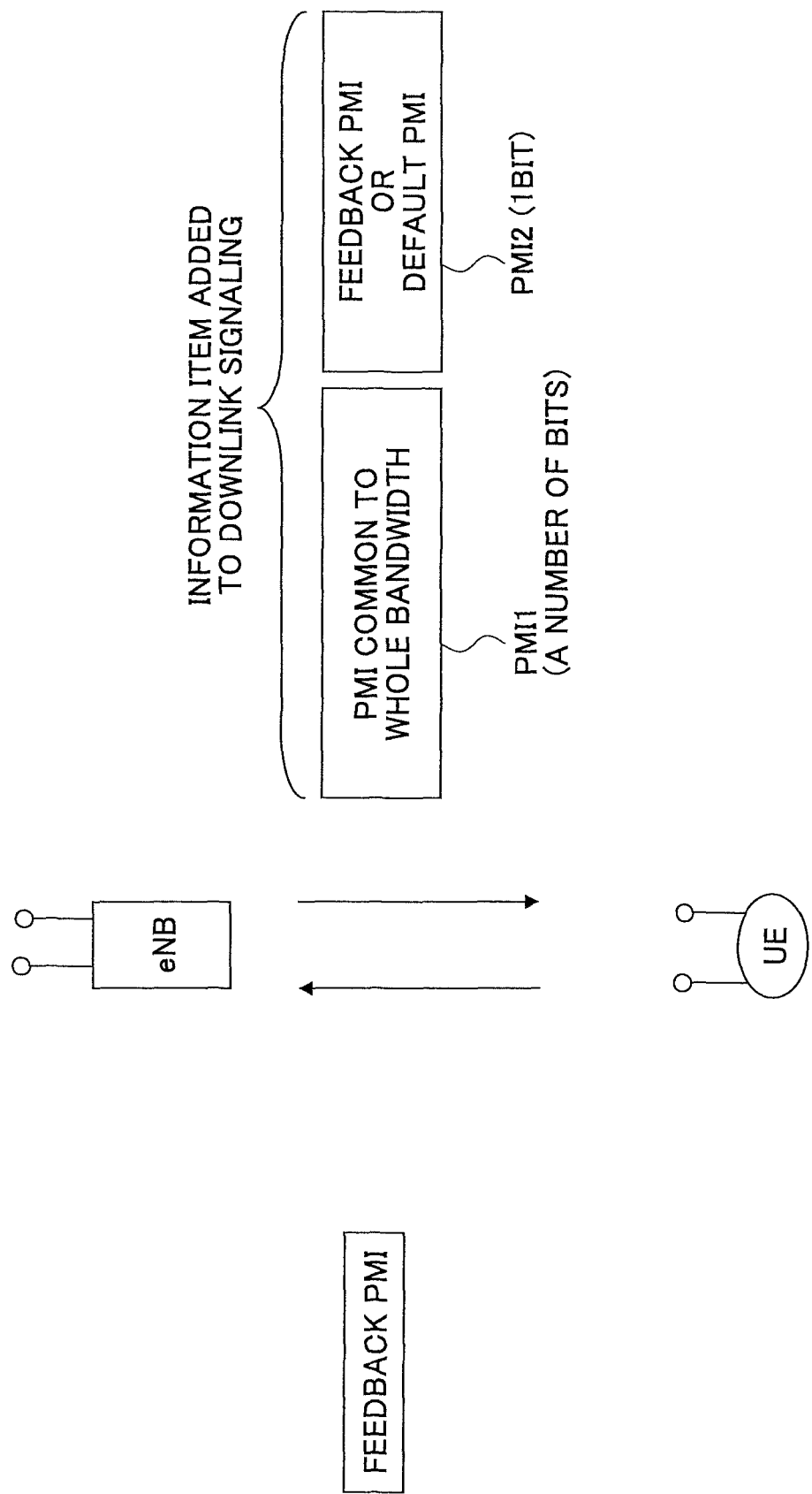
FIG. 5 is a diagram illustrating principles of the present invention.

As illustrated in FIG. 5, in one embodiment of the present invention, first indicator information and second indicator information (PMI1, PMI2) are added to the PDCCH. A total of bits required in the PMI1 and the PMI2 only amounts to several bits (for example, 5 bits) at most. The first indicator information PMI1 is used to report, to a user which has reported the PMI in the PUCCH, a pre-encoding matrix used on the PDSCH by the base station apparatus. For the user which reported, together with the CRC bit, the PMI, the first indicator information PMI1 is ignored. The user apparatus retains in memory whether the PMI is reported in the PUCCH or the PUSCH, so that it can appropriately determine whether information to be read by the own apparatus is the first indicator information PMI1 or the second indicator information PMI2. Always including, in the PDCCH, the first indicator information and the second indicator information makes it possible to unify formats of the PDSCH and the PDCCH, which is transmitted therewith, regardless of whether the user is allocated the PUSCH. Therefore, the user apparatus does not have to execute the blind detection multiple times to provide for multiple formats.

The second indicator information PMI2 is used to report, to the user which has reported the PMI with the CRC bit, whether the feedback PMI has been accurately received at the base station apparatus. The second indicator information PMI2 is ignored for the user which has reported the PMI in the PUCCH. If the base station apparatus can accurately receive the feedback PMI, the PDSCH is pre-encoded according to the PMI. The user apparatus determines that the base station apparatus has conducted an accurate reception to make it possible to properly reconstruct the PDSCH in the same matrix as what it was reported in. If the base station apparatus cannot accurately receive the feedback PMI, a default matrix is used in pre-encoding the PDSCH. The default matrix may be a fixed matrix which is predetermined between the base station apparatus and the mobile station apparatus, or may report, in conjunction with the first indicator information PMI1, a pre-encoding matrix selected from a codebook by the base station. The user apparatus determines that the base station apparatus could not conduct the accurate reception to make it possible to properly reconstruct the PDSCH in the same default matrix.

For convenience of explanation, while the present invention will be described by breaking it down into a number of items, the breakdown is not essential to the present invention. While specific numerical value examples are used to facilitate understanding of the present invention, such numerical values are merely examples, so that any appropriate value may be used unless specified otherwise.

Embodiment 1

Configuration of User Apparatus

Figure 6:
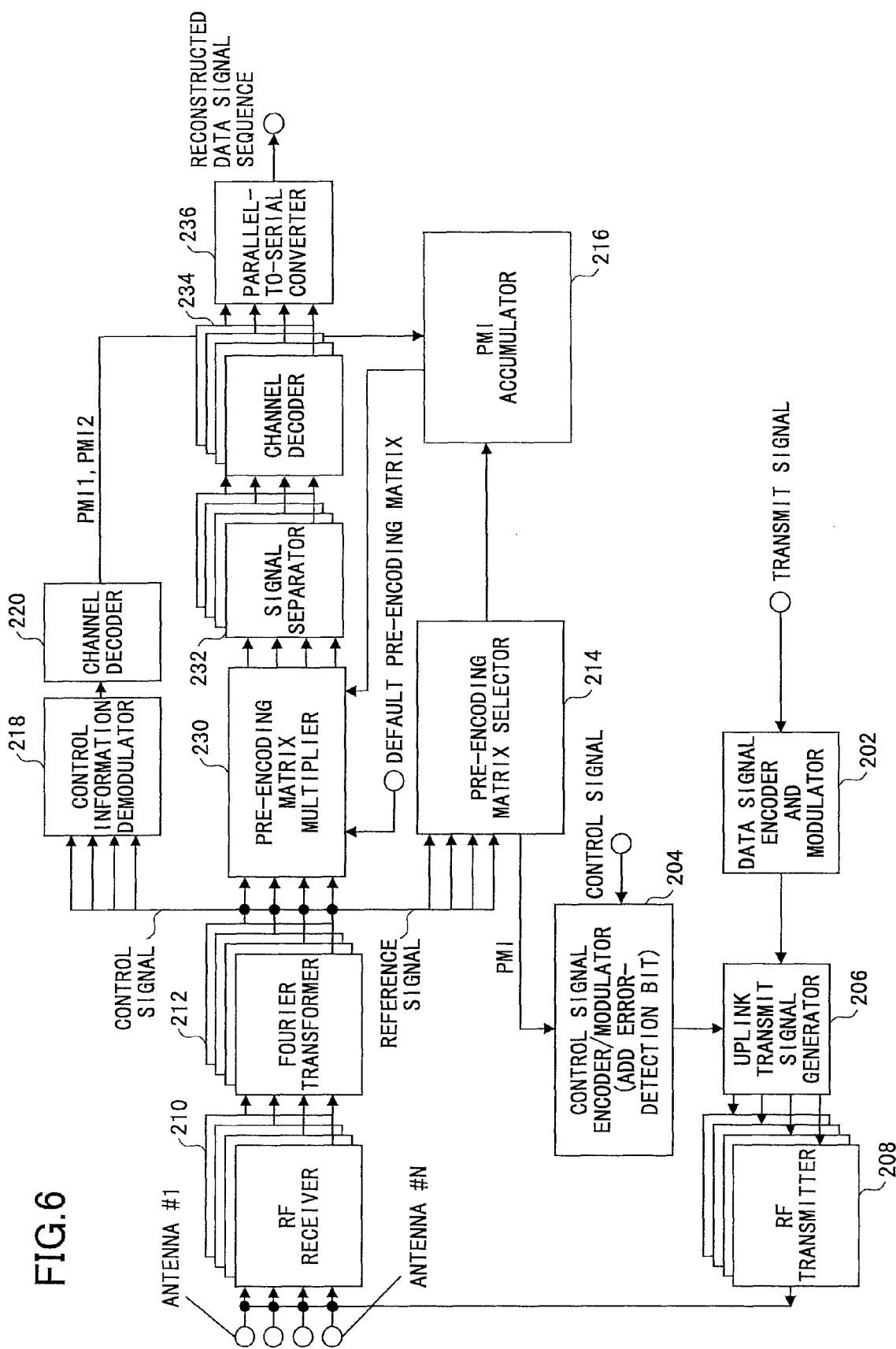
FIG. 6 is a functional block diagram of a user apparatus according to an embodiment of the present invention.

FIG. 6 is a functional block diagram of a user apparatus according to an embodiment of the present invention. In FIG. 6 are drawn a data signal encoder and modulator 202; a control signal encoder and modulator 204; an uplink transmit signal generator 206; a RF transmitter 208; an RF receiver 210; a Fourier transformer 212; a pre-encoding matrix selector 214; a PMI accumulator 216; a control information demodulator 218; a channel decoder 220; a pre-encoding matrix multiplier 230; a signal separator 232; a channel decoder 234; and a parallel-to-serial converter 236.

The data signal encoder and modulator 202 perform channel encoding and data modulation on a physical uplink shared channel PUSCH.

The control signal encoder and modulator 204 perform channel encoding and data modulation on an uplink L1/L2 control channel or a PUCCH.

The uplink transmit signal generator 206 properly maps a control channel and a data channel, providing transmission streams. For example, a process such as inverse Fourier transformation, etc., a process such as mapping in the frequency domain, or discrete Fourier transformation is conducted for each stream.

Figure 7:
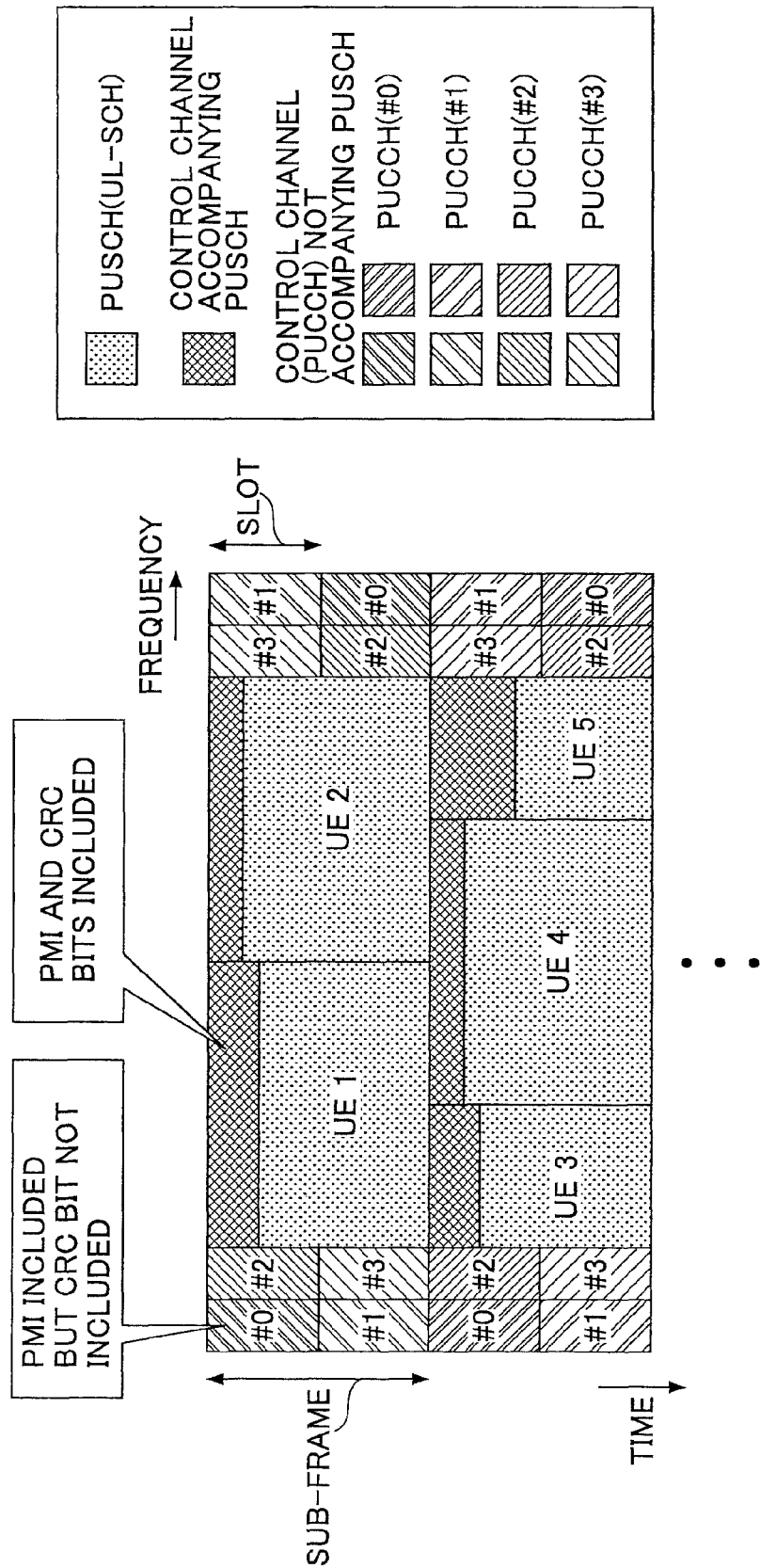
FIG. 7 is a diagram illustrating an example of uplink channel mapping.

FIG. 7 shows an exemplary channel mapping amounting to two sub-frames in uplink. As an example, one sub-frame includes two slots, one of which slots includes seven OFDM symbols. The user to which is allocated a radio resource for transmitting the PUSCH transmits user data and the control channel using the radio resource.

The uplink L1/L2 control channel which accompanies the PUSCH includes not only resource allocating information, but also an error detection bit (for example, a CRC bit), which is derived from the PMI to be fed back to the base station apparatus and a signal which includes the PMI. The pre-encoding matrix specified by the PMI may express a matrix applied to the whole system bandwidth and multiple matrices ($PMI_A$ to $PMI_D$ in FIG. 2) applied to a region of the system bandwidth.

A user to which a radio resource for transmitting the PUSCH is not allocated also has to transmit CQI (received quality of a downlink reference signal), an uplink reference signal (UL-RS), ACK/NACK, etc. Such a user transmits them in a PUCCH as shown in the columns on the left and right in FIG. 7. Which slot in which sub-frame the PUCCH for a certain user is and how the PUCCH for the certain user is user multiplexed, etc., are determined on a fixed basis at the time of setting a connection, for example. For example, a reporting frequency of CQI, UL-RS, etc., is determined depending on the QoS required at a radio bearer. In the example shown, the PUCCHs of four users are transmitted within one sub-frame. A method of user multiplexing in the PUCCH may be frequency division multiplexing (FDM) as shown, code division multiplexing (CDM), or a combination of the two.

The PUCCH according to the present embodiment includes not only a CQI, an uplink reference signal, ACK/NACK, etc., but also a PMI to be fed back to the base station apparatus. Unlike the uplink L1/L2 control channel accompanying the PUSCH as described above, the PUCCH does not include a CRC bit. Moreover, in the present embodiment, attention needs to be given to the fact that the pre-encoding matrix specified in the PMI only expresses one matrix to be applied to the whole system bandwidth. A large number of bits are required to express multiple matrices to be applied to parts of the system bandwidth because the number of bits which can be transmitted in the PUCCH is generally small. If a sufficiently large number of bits which can be transmitted in the PUCCH are secured, the pre-encoding matrix specified in the PMI may express not only one matrix to be applied to the whole system bandwidth, but also multiple matrices to be applied to regions of the system bandwidth.

The RF transmitter 208 in FIG. 6 converts a base band stream to a signal for wirelessly transmitting from multiple transmit antennas. Such a process may include digital-analog conversion, bandwidth limiting, power amplification, etc., for example.

The RF receiver 210, in reverse of the RF transmitter 208, convert radio signals obtained from the multiple receive antennas into base band streams. Such a process may include performing, for each stream, the power amplification, the bandwidth limiting and analog-digital conversion.

The Fourier transformer 212 fast Fourier transforms and OFDM demodulates each stream.

The pre-encoding matrix selector 214 determines a pre-encoding matrix suitable for downlink based on a received status of a reference signal in the received signal, and outputs a PMI which indicates the same. Typically, the pre-encoding matrix is any one of a predetermined number of matrices ($U_1$, $U_2$ ... $U_P$) that are stored in advance in a code book. Therefore, the PMI specifies anyone ($U_i$) of a predetermined number of matrices ($U_1$, $U_2$, . . . , $U_P$). More generally, the pre-encoding matrix may be not a selection from which one is selected, but may be adjusted in a manner which is adaptive to any suitable matrix.

Figure 1:
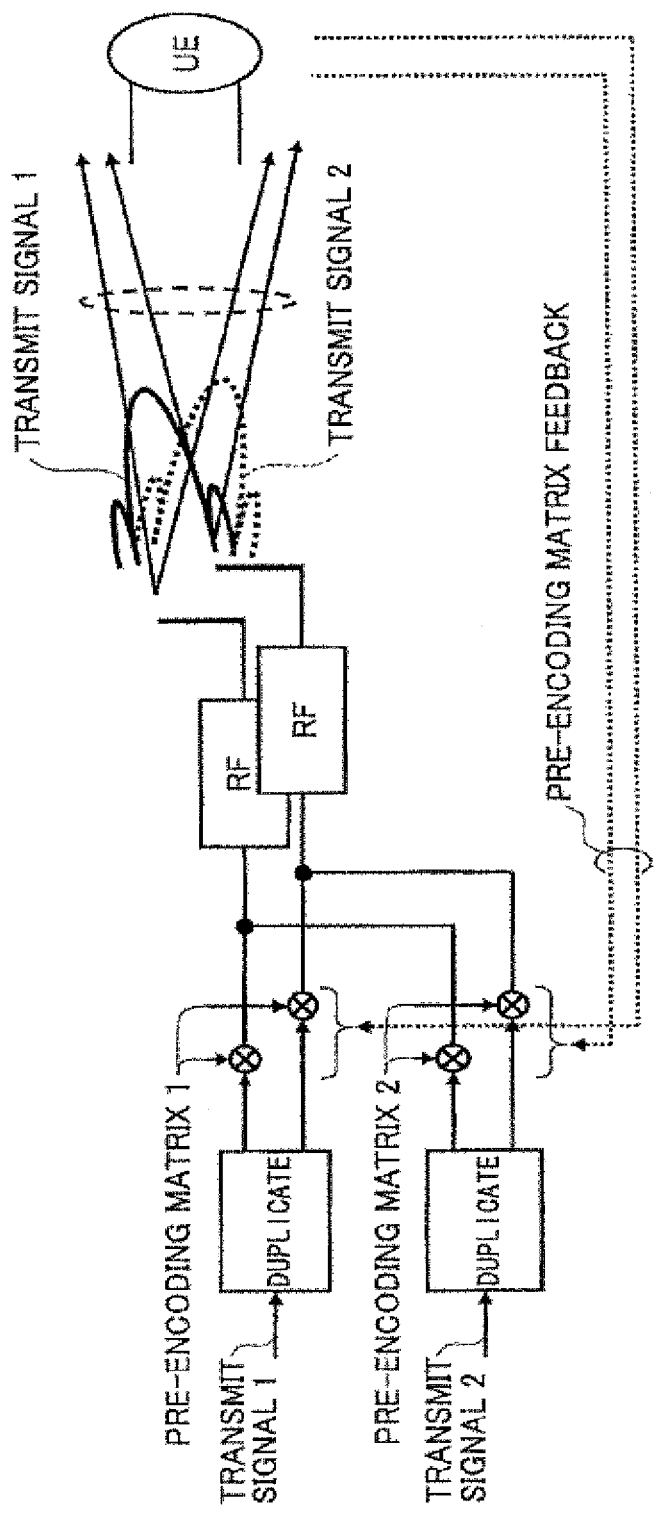
FIG. 1 schematically illustrates how pre-encoding is performed.
Figure 2:
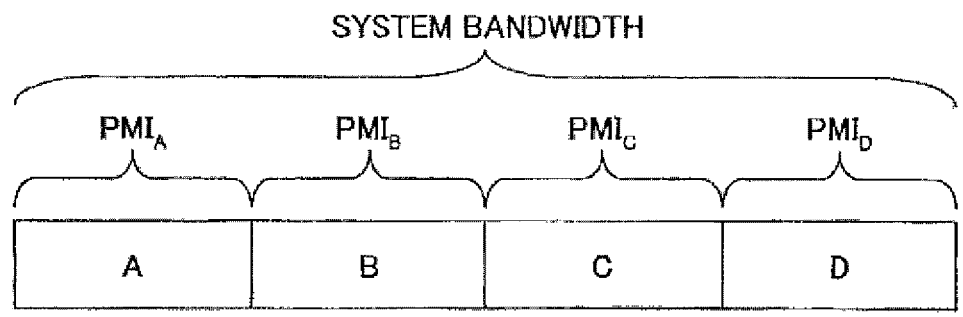
FIG. 2 illustrates how a pre-encoding matrix is optimized for each bandwidth region.

As mentioned in conjunction with FIG. 2, one pre-encoding matrix may be specified for the whole system bandwidth or the pre-encoding matrix may be specified for each bandwidth region which constitutes the system bandwidth. In the present embodiment, the pre-encoding matrix which is selected using a user apparatus which transmits a physical uplink shared channel PUSCH may be one matrix to be applied to the whole system bandwidth or may be specified for each bandwidth region which constitutes the system bandwidth. The pre-encoding matrix selected using the user apparatus which does not transmit the physical uplink shared channel PUSCH is merely a matrix to be applied to the overall system bandwidth, and, in this case, it is prohibited to specify a pre-encoding matrix for each bandwidth region.

The PMI accumulator 216 keeps, for a certain period, the PMI determined by the pre-encoding matrix selector 214.

The control information demodulator 218 demodulates a control signal (more specifically, a PDCCH) within a received signal.

The channel decoder 220 performs channel decoding, in some decoding units, on control information. A unit of channel decoding is aligned with a unit of encoding performed at the transmitter.

Using the control information demodulator 218 and the channel decoder 220, first and second indicator information sets (PMI1, PMI2) for specifying a pre-encoding matrix to be applied to the PDSCH in addition to downlink resource allocation information are extracted. The first indicator information PMI1 indicates a pre-encoding matrix used for the PDSCH by the base station apparatus. This pre-encoding matrix is to be applied to the overall system bandwidth and not to be applied for each bandwidth region. The second indicator information PMI2 indicates whether the base station apparatus could receive, without error, a feedback PMI transmitted with the CRC bit by the user apparatus. If it could conduct reception without error, a pre-encoding matrix specified by the user apparatus in a feedback PMI is used. Otherwise, a default pre-encoding matrix is used.

A pre-encoding matrix multiplier 230 weights a received physical downlink shared channel using a pre-encoding matrix. The pre-encoding matrix may be a matrix reported previously in a feedback by a user apparatus to a base station apparatus, a matrix specified by the base station apparatus, or a matrix determined by default.

The signal separator 232 uses some signal separation algorithm which is known in the art to separate the received signal into individual streams.

The channel decoder 234 performs channel decoding on the downlink physical shared channel.

The parallel-serial converter 236 converts parallel streams into a serial signal stream. The converted signal is output as a signal which is reconstructed to be a signal previously transmitted from the base station apparatus.

Configuration of Base Station Apparatus

Figure 8:
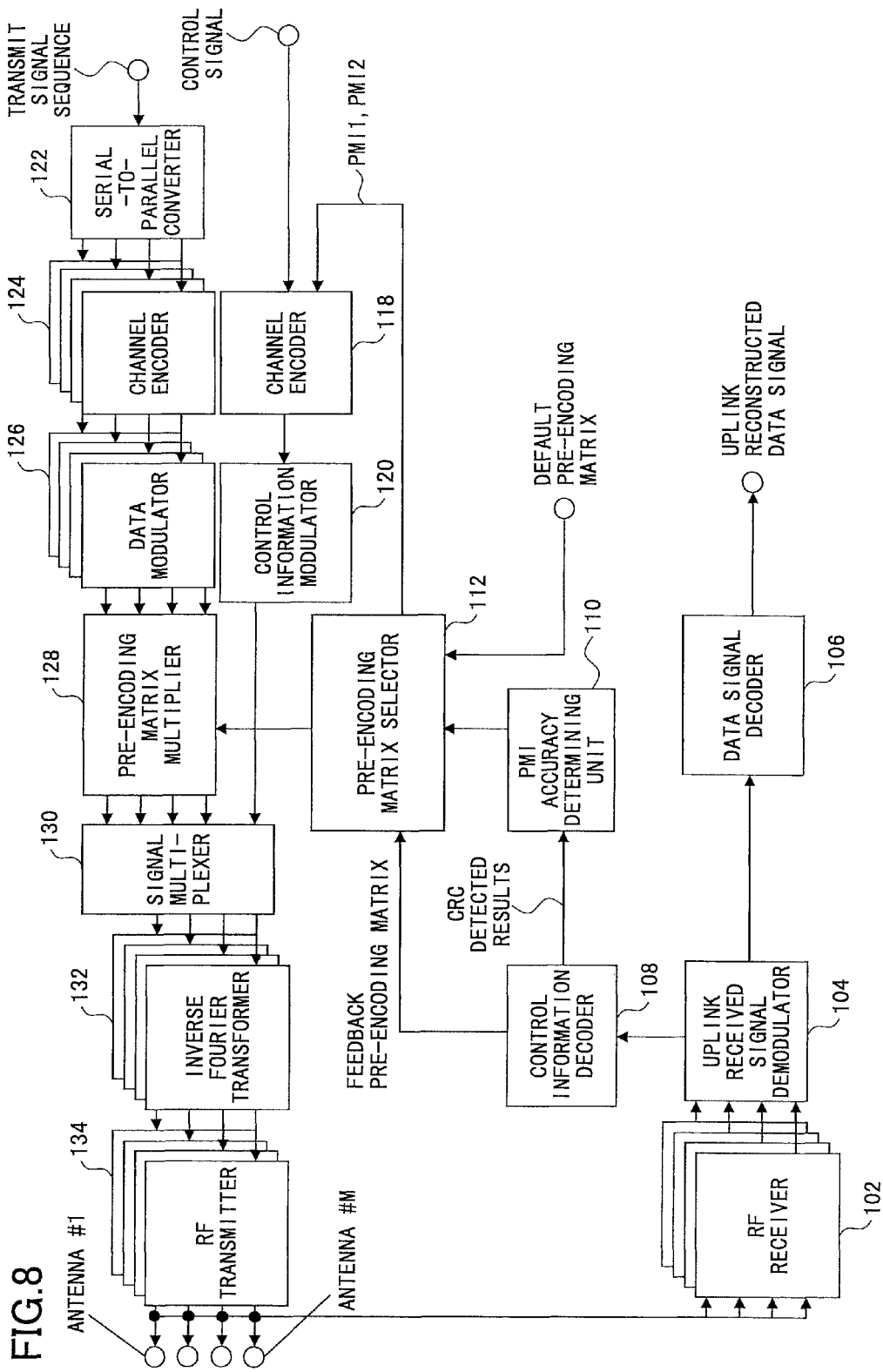
FIG. 8 is a functional block diagram of a base station apparatus according to an embodiment of the present invention.

FIG. 8 is a functional block diagram illustrating a base station apparatus according to an embodiment of the present invention. In FIG. 8 is shown an RF receiver 102, an uplink received signal demodulator 104, a data signal decoder 106, a control information decoder 108, a PMI accuracy determining unit 110, a pre-encoding matrix selector 112, a channel encoder 118, a control information modulator 120, a serial-to-parallel converter 122, a channel encoder 124, a data modulator 126, a pre-encoding matrix multiplier 128, a signal multiplexer 130, an inverse Fourier transformer 132, and an RF transmitter 134.

The RF receiver 102 performs a signal process for converting, to a base band digital signal, each of signals received by multiple antennas #1-#M. The signal process may include power amplification, bandwidth limiting, analog-digital conversion, etc., for example.

The uplink received signal demodulator 104 properly separates a reference signal, a control channel (L1/L2 control channel, etc.), an uplink PUSCH etc., transmitted uplink and received. Channel estimation and received signal quality measurement, etc. based on the received status of the reference signal are also performed. The received signal quality may be measured in SINR, for example.

The data signal decoder 106 separates signals transmitted from the respective transmit antennas and received into one or more streams and decoded per stream. The decoding is performed such that it corresponds to what has been performed at the transmitter. At the time of the decoding, an error correction is performed together with likelihood information.

The control information decoder 108 decodes the control channel and extracts an L1/L2 control channel, etc. In the present embodiment, the control information decoder 108 also extracts information on the PMI and specifies a pre-encoding matrix reported from the user apparatus. When not only the PMI but also a CRC error detection bit which accompanies the PMI is received, an error detection process is performed on the PMI and the CRC detection result is also output.

The PMI accuracy determining unit 110 determines whether a PMI fed back from the user apparatus (UE) is accurate. For example, when not only the PMI, but also an error check bit on the PMI is received from the user apparatus, the error check bit may be used to determine the accuracy of the PMI. The accuracy of the PMI may be auxiliarily determined based on whether a received quality (for example, received SINR) of an uplink reference signal received from the user apparatus is good, in addition to the error checking using the error check bit. Alternatively, the accuracy of the PMI may be determined auxiliarily based on a likelihood obtained at the time of decoding an uplink shared data channel. Moreover, the likelihood obtained at the time of decoding the received PMI itself may be used.

The pre-encoding matrix selector 112 determines the pre-encoding matrix to be used in downlink communication based on predetermined determining criteria and the determined results from the PMI error determining unit 110. The predetermined determining criteria may be traffic volume, the number of antennas, the number of streams required for downlink communication, etc. For example, when the PMI is correctly received, the matrix indicated using the PMI may be used as a pre-encoding matrix. If a PMI received with the CRC bit is erroneous, a default matrix which is predetermined between the base station apparatus and the user apparatus is used as a pre-encoding matrix. For a user apparatus which has fed back the PMI with the CRC, the pre-encoding matrix selector 112 sets, according to an instruction (PMI2=0) of the user apparatus, the pre-encoding matrix to be actually used in downlink, or such that it changes to default (PMI2=1). The user apparatus has reported values of PDSCH as well as the PMI2 value. For the user apparatus which has fed back only the PMI but without the CRC, the pre-encoding matrix selector 112 sets, according to user instructions, a pre-encoding matrix to be used in downlink communications. In this case, the PMI which indicates a pre-encoding matrix to be actually used is reported to the user apparatus together with the PDSCH.

The channel encoder 118 performs channel encoding with the information part as a unit of encoding.

The control information modulator 120 data modulates a channel-encoded signal.

The serial-parallel converter 122 converts, to multiple parallel streams, a serial transmit signal to be transmitted in a physical downlink shared channel.

The channel encoder 124 channel encodes individual streams.

The data modulator 126 data modulates the channel encoded signal.

The pre-encoding matrix multiplier 128 provides weighting with the pre-encoding matrix using the individual streams. The pre-encoding matrix is what is determined in the pre-encoding matrix selector 112.

The signal multiplexer 130 multiplexes a control channel, a physical shared channel, and other channels.

The inverse fast Fourier transformer 132 inverse fast Fourier transforms the respective streams multiplexed, and modulates the same using OFDM.

The RF transmitter 134 performs a process for converting individual streams into a signal which is wirelessly transmitted from multiple transmit antennas. Such a process includes adding a guard interval, digital-analog conversion, bandwidth limiting, power amplification, etc.

A First Exemplary Operation

Figure 9:
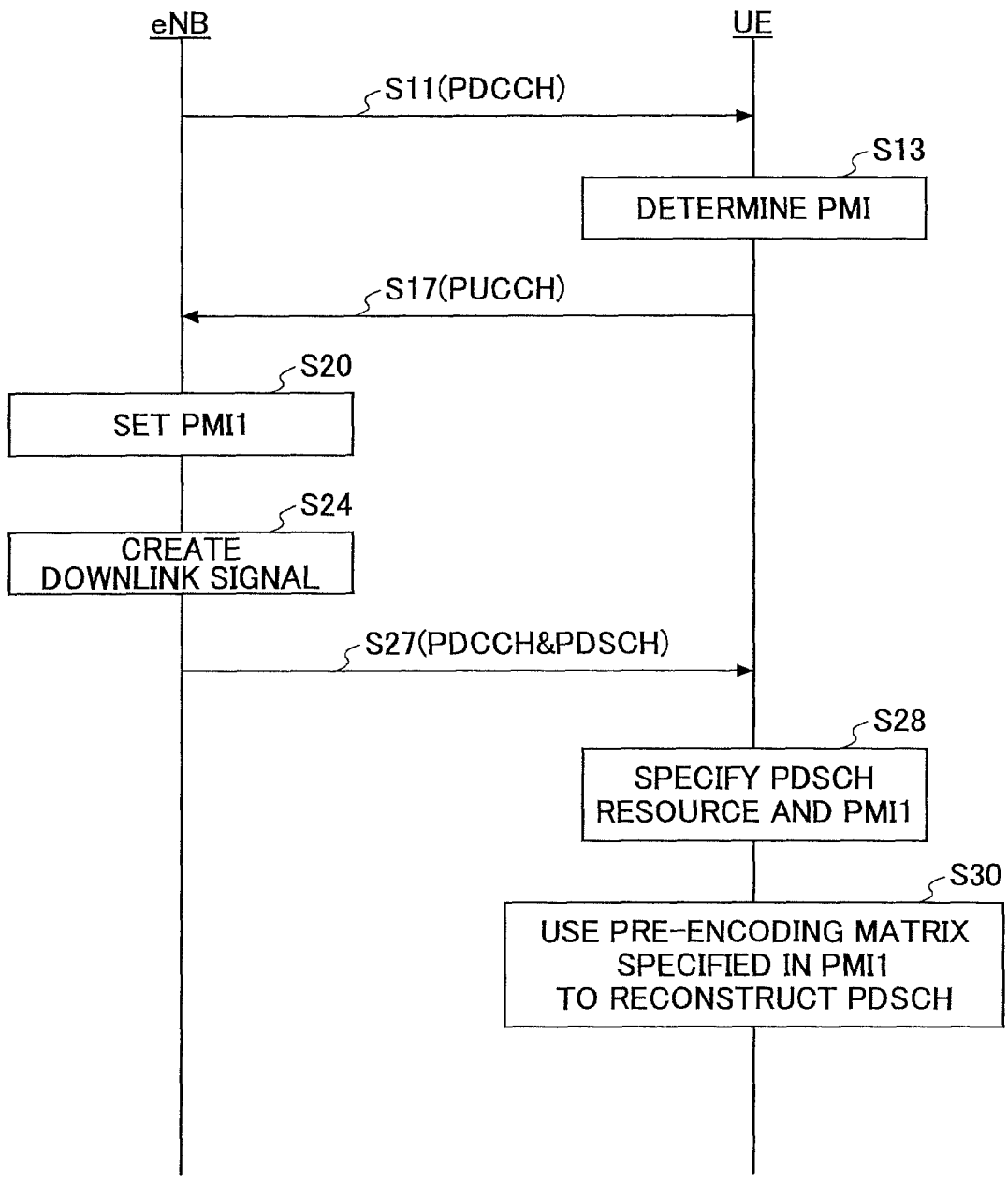
FIG. 9 is a view showing an exemplary operation in which a PUSCH is not transmitted.

FIG. 9 shows a first exemplary operation according to one embodiment of the present invention. A base station apparatus and a user apparatus conduct MIMO-type communications using multiple antennas. A pre-encoding matrix to be applied to individual antennas of the base station apparatus is adaptively controlled based on a feedback (PMI) from the user apparatus (UE) to the base station apparatus (eNB).

In step S11, a physical downlink control channel PDCCH is transmitted to the user apparatus. Generally, a physical downlink shared channel PDSCH may also be transmitted, but only the PDCCH is illustrated in step S11 for brevity of illustration and explanation. Based on a downlink reference symbol (DL-RS) received with the PDCCH, the user apparatus measures a downlink radio propagation condition (channel status) and provides a CQI to be reported to the base station apparatus.

The user apparatus demodulates and decodes the PDCCH and determines whether a radio resource is allocated to the PDSCH or the PUSCH for the own apparatus. When a downlink radio resource is allocated, the user apparatus specifies a resource to be specified in downlink scheduling information and receives a physical downlink shared channel PDSCH. If the radio resource is allocated to the PUSCH, the user apparatus specifies a resource specified in uplink scheduling information and uses the resource to transmit the physical uplink shared channel (PUSCH) at an appropriate subsequent timing. In the present exemplary operation, it is assumed that the resource for the physical uplink shared channel is not allocated to the user apparatus.

In step S13, based on the measured channel status, the user determines a pre-encoding matrix which is most suitable for downlink. Typically, the pre-encoding matrix is any one of a predetermined number of matrices ($U_1, U_2, \ldots, U_P$) that are stored in advance in a code book. The individual matrices ($U_1, U_2, \ldots, U_P$) express one matrix to be applied to the total system bandwidth. The pre-encoding matrix $U_i$ is specified in PMI. As an example, when P=8, 16, the PMI can be expressed in 3-4 bits.

In step S17, the pre-encoding matrix indicator PMI, which indicates a matrix determined in step S13, is fed back to the base station apparatus eNB. This feedback is performed using the PUCCH which is allocated to this user apparatus in a fixed manner. The PMI reported to the base station apparatus in the PUCCH specifies one of matrices to be applied to the overall system bandwidth. The PMI does not specify multiple numbers of matrices to be applied to a part of the system bandwidth. When feeding back the PMI in the PUCCH, prohibiting an optimization of a pre-encoding matrix for each of multiple bandwidth regions makes it possible to avoid a shortage of bits in the PUCCH.

In step S20, the base station apparatus receives the PUCCH and determines a pre-encoding matrix determined by the user apparatus. The PMI which specifies the pre-encoding matrix determined sets first indicator information PMI1.

In step S24, a signal transmitted downlink is provided. The signal generally includes the PDCCH and the PDSCH. The PDCCH includes, in addition to uplink and downlink scheduling information, also first indicator information PMI1 and the below-described second indicator information PMI2. The PDSCH includes user data to be transmitted to individual users. The second indicator information PMI2 of the present exemplary operation that exists at this time does not include significant information but may be what remains to be information used in the past, or may be set to a default value. In the present operational flow, the PMI2 acts as dummy data.

In step S27, a signal which includes the PDCCH and the PDSCH is transmitted to the user apparatus.

In step S28, the user apparatus demodulates and decodes the PDCCH and determines whether a radio resource is allocated to the PDSCH or the PUSCH for the own apparatus. If the radio resource is allocated to the PDSCH, the radio resource is specified. Based on the fact that the own apparatus previously (in step S17) reported the PMI, the first indicator information PMI1 is extracted from the PDCCH and the own apparatus ignores the second indicator information PMI2.

In step S30, a pre-encoding matrix specified in the PMI1 is used to reconstruct the PDSCH. The pre-encoding matrix $U_i$, which is specified in the PMI1, is what is determined from the feedback PMI by the base station apparatus in step S20. The feedback PMI is a pre-encoding matrix $U_j$, determined by the user apparatus in step S13. Therefore, it becomes $U_i=U_j$, in principle. However, the PMI may be erroneously transmitted at the time of the feedback in step S17, or the feedback PMI may be erroneously recognized by the base station apparatus. As a result, the matrix $U_j$, which is expected by the user apparatus, and the matrix $U_i$, which is determined by the base station apparatus, fail to be the same, so that without the first indicator information PMI1 as in the present embodiment, the user apparatus may not be able to reconstruct, in high quality, the PDSCH. However, in the present embodiment, information indicating what pre-encoding matrix applied to the PDSCH is reported to the user apparatus as the first indicator information PMI1. Even if there is a lack of matching recognition on the pre-encoding matrices between the base station apparatus and the user apparatus, the user apparatus uses a matrix specified in the first indicator information PMI1 to make it possible to properly reconstruct the PDSCH.

According to the present exemplary operation, even if the feedback PMI is erroneously recognized by the base station apparatus, the PMI used in the PDSCH accompanies the PDSCH, so that the user apparatus can properly reconstruct the PDSCH in the same pre-encoding matrix as what is used in the PDSCH. The PMI merely specifies one of matrices to be applied to the whole system bandwidth and requires only 3-4 bits, for example. Therefore, an excessively large amount of downlink signaling is avoided.

A Second Exemplary Operation

Figure 10:
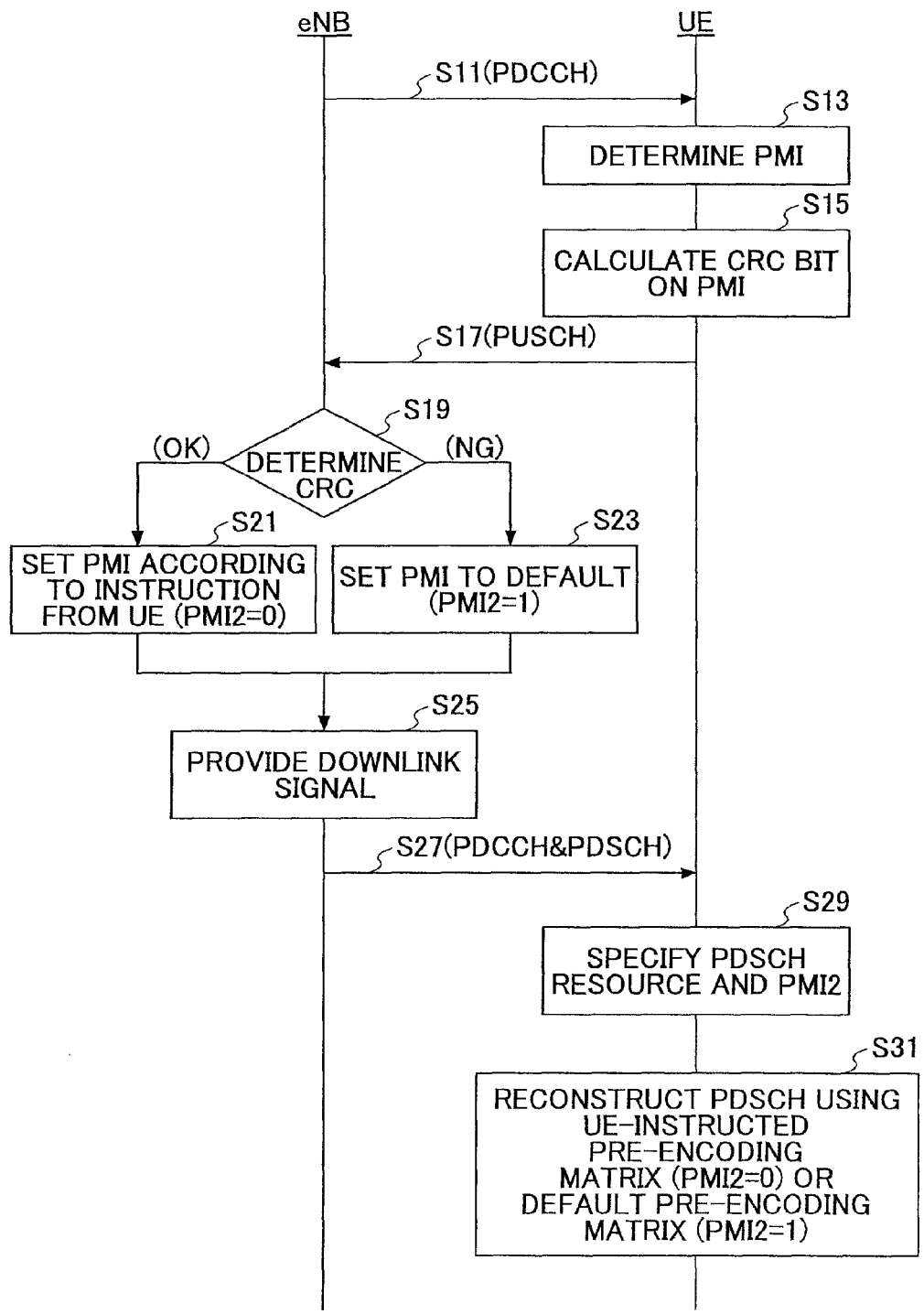
FIG. 10 is a view showing an exemplary operation in which the PUSCH is transmitted.

FIG. 10 shows a second exemplary operation according to one embodiment of the present invention. As in the first exemplary operation, the base station apparatus and the user apparatus conduct MIMO-type communications using multiple antennas. The pre-encoding matrix to be applied to individual antennas of the base station apparatus is adaptively controlled based on a feedback (PMI) from the user apparatus (UE) to the base station apparatus (eNB). As shown, the same reference letters are used for steps corresponding to or similar to those described in FIG. 9.

In step S11, the physical downlink control channel PDCCH is transmitted to the user apparatus. Based on a downlink reference symbol (DL-RS) received with the PDCCH, the user apparatus measures a downlink radio propagation condition (channel status) and provides a CQI to be reported to the base station apparatus.

The user apparatus demodulates and decodes the PDCCH and determines whether a radio resource is allocated to the PDSCH or the PUSCH for the own apparatus. If a downlink radio resource is allocated, the user apparatus specifies a resource specified in downlink scheduling information and receives a physical downlink shared channel (PDSCH). If the uplink radio resource is allocated, the user apparatus specifies a resource specified in the uplink scheduling information and uses the resource to transmit the physical uplink shared channel (PUSCH) at an appropriate subsequent timing. In the present exemplary operation, unlike the first exemplary operation, it is assumed that a resource for the PUSCH is allocated to the user apparatus.

In step S13, based on the measured channel status, the user apparatus determines a pre-encoding matrix which is most suitable for downlink. Typically, the pre-encoding matrix is any one of a predetermined number of matrices ($U_1$, $U_2$, . . . , $U_P$) already stored in advance in a code book. The individual matrices ($U_1, U_2, \ldots, U_P$) may express one matrix to be applied to the overall system bandwidth. If the system bandwidth is divided into a number of bandwidth regions, and a pre-encoding matrix is optimized for each of the bandwidth regions, unlike the first exemplary operation, the above-described matrices ($U_1, U_2, \ldots, U_P$) may express matrices to be applied to bandwidth regions. At any rate, the PMI specifies one or more from within a predetermined number of matrices ($U_1, U_2, \ldots, U_P$) for the whole system bandwidth or the bandwidth regions. The pre-encoding matrix determined to be suitable in downlink is specified in the PMI. As an example, when P=8, 16, one of the PMIs can be expressed in 3-4 bits. If the PMI is provided for each bandwidth region, all of the PMIs may be expressed in a number of bits, which is 3 to 4 bits, multiplied by a factor of the number of bandwidth regions.

More generally, the pre-encoding matrix may be not a selection from which one is selected, but may be adjusted in a manner which is adaptive to any suitable matrix. Limiting a matrix which may be a pre-encoding matrix to the selection, from which one is selected, is preferable from a point of view of reducing the burden of matrix control operation while making it possible to perform adaptive control.

In step S15, some operation is applied to an information part including at least the PMI and the error detection bit (typically, the CRC bit) is derived. The information part including the PMI may include some control information besides the PMI, or may include just the PMI. From the point of view of increasing the error detection accuracy, it is more preferable for the number of bits when the error detection bit is derived to be larger. Therefore, when it suffices to express only one matrix to be applied to the whole system bandwidth, it is preferable that an error detection bit be derived with any other control information, not just the PMI. In the meantime, when the pre-encoding matrix to be applied to a part of the system bandwidth is provided in multiple numbers, even only the multiple PMIs will take up a relatively large number of bits, so that only the PMIs may be what is operated on for the error detection bit. This also applies to error correction encoding.

In step S17, a pre-encoding matrix indicator PMI, which shows a matrix determined in step S13, and an error detection bit which has been derived from the information part including the PMI are fed back to the base station apparatus eNB. The feedback is performed using the PUSCH, which is different from the first exemplary operation. The PMI reported to the base station apparatus in the PUSCH may specify one of matrices to be applied to the whole system bandwidth, or may specify multiple matrices provided of the bandwidth regions. The reason why both the former and the latter are allowed is that, when the PMI is fed back in the PUSCH, the restriction of the transmission capacity is not as severe as the PUCCH.

In step S19, the base station apparatus receives the PUSCH and determines whether the feedback PMI has been received without error. If it has been received without error, the process proceeds to step S21, otherwise it proceeds to step S23.

In step S21, the pre-encoding matrix which is determined by the user apparatus and which is specified in the feedback PMI is used in the PDSCH. In this case, the second indicator information PMI2 is set to a predetermined value (for example, "0").

In step S23, what is in the feedback PMI is ignored and the default pre-encoding matrix is used in the PDSCH. In this case, the second indicator information PMI2 is set to a different predetermined value (for example, "1").

In step S25, a signal to be transmitted in downlink is provided. The signal also generally includes the PDCCH and the PDSCH. The PDCCH includes, in addition to uplink and downlink scheduling information, also first indicator information PMI1 and the second indicator information PMI2. The first indicator information PMI1 of the present exemplary operation that exists at this time does not include information which is significant at this time, may be what remains of information used in the past, or may be set to a default value. In the present process flow, the PMI1 functions as dummy data.

In step S27, a signal which includes the PDCCH and the PDSCH is transmitted to the user apparatus.

In step S28, the user apparatus demodulates and decodes the PDCCH and determines whether a radio resource is allocated to the PDSCH or the PUSCH for the own apparatus. If the radio resource is allocated to the PDSCH, the radio resource is specified. According to the fact that the own apparatus previously (in step S17) reported the PMI in the PUSCH, the second indicator information PMI2 is extracted from the PDCCH and the first indicator information PMI1 is ignored.

In step S30, when the second indicator information PM12 is a predetermined number (for example, 0), the PDSCH is reconstructed using the pre-encoding matrix reported to the base station apparatus in the past by the own apparatus. If the PMI2 is a different predetermined value (for example, 1), the PDSCH is reconstructed using the default pre-encoding matrix. The pre-encoding matrix previously reported to the base station apparatus in the past by the own apparatus is ignored. As described above, the PMI may be erroneously transmitted at the time of feedback in step S17. In this case, the matrix $U_j$ expected by the user apparatus and the matrix $U_i$ determined by the base station apparatus could end up not being the same, leading to a possibility for the user apparatus to not able to reconstruct the PDSCH in high quality. However, the present embodiment makes it possible for the base station apparatus to determine, based on the CRC bit, whether the feedback PMI could be received without error, deciding on, depending on the determined results, the pre-encoding matrix to be applied to the PDSCH. Then, information indicating whether there has been an error is reported as the second indicator information PMI2 to the user apparatus. If there is no error, the perception is that the pre-encoding matrices match between the base station apparatus and the user apparatus. In this case, the fact that the feedback PMI has been received, without error, at the base station apparatus is reported to the user apparatus, which user apparatus may be sure to use the matrix previously reported by the own apparatus. On the other hand, if there is an error, the base station apparatus is not able to know the feedback PMI and the base station apparatus cannot use the matrix intended by the user apparatus. In this case, the fact that there has been an error is reported to the user apparatus and a default matrix is used as the pre-encoding matrix to make perceptions of the base station apparatus and the user apparatus match.

According to the present embodiment, the PMI, etc., are fed back in the PUSCH in which a large number of bits may be transmitted, not in the PUCCH, in which the number of transmission bits are significantly restricted. Not only the PMI, but also the CRC bit for the PMI is reported to the base station apparatus to make it possible to accurately determine whether the feedback PMI could be received without error. Regardless of whether the feedback PMI could be received without error, the determined results are reported to the user apparatus to make it possible to match the perception of the base station apparatus and that of the user apparatus on the pre-encoding matrix and to properly reconstruct the PDSCH.

The proper reconstruction of the PDSCH at the user apparatus may be facilitated by adding the first indicator information PMI1 to the PDSCH in the case of the first exemplary operation, and adding the second indicator information PMI2 to the PDSCH in the case of the second exemplary operation. The PMI1 is at most a few bits and the PMI2 also is merely in the order of one bit, so that a combination of the two yields only a few bits (for example, in the order of 5 bits). Such an addition of control bits is performed to make it possible for a user apparatus to correctly specify the pre-encoding matrix to be used in the downlink data transmission and to make it possible to achieve a more efficient downlink signaling.

Variation

Figure 3:
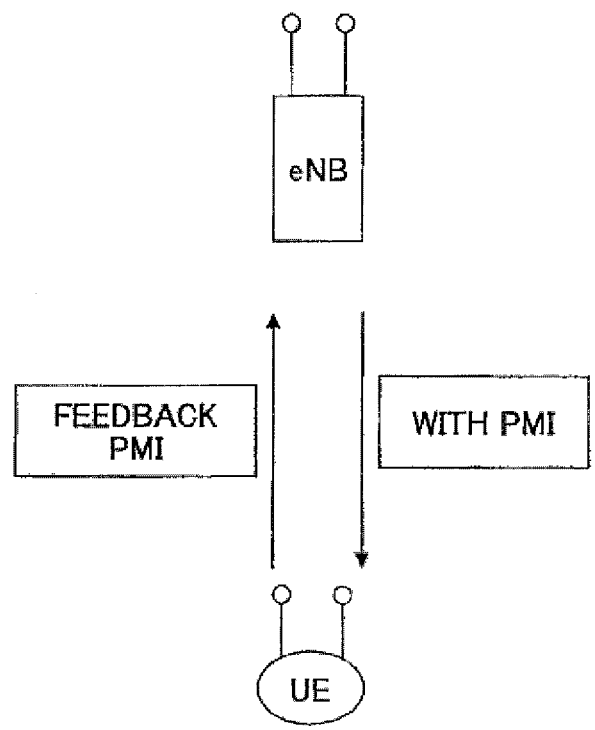
FIG. 3 is a view for explaining a conventional problem.
Figure 4:
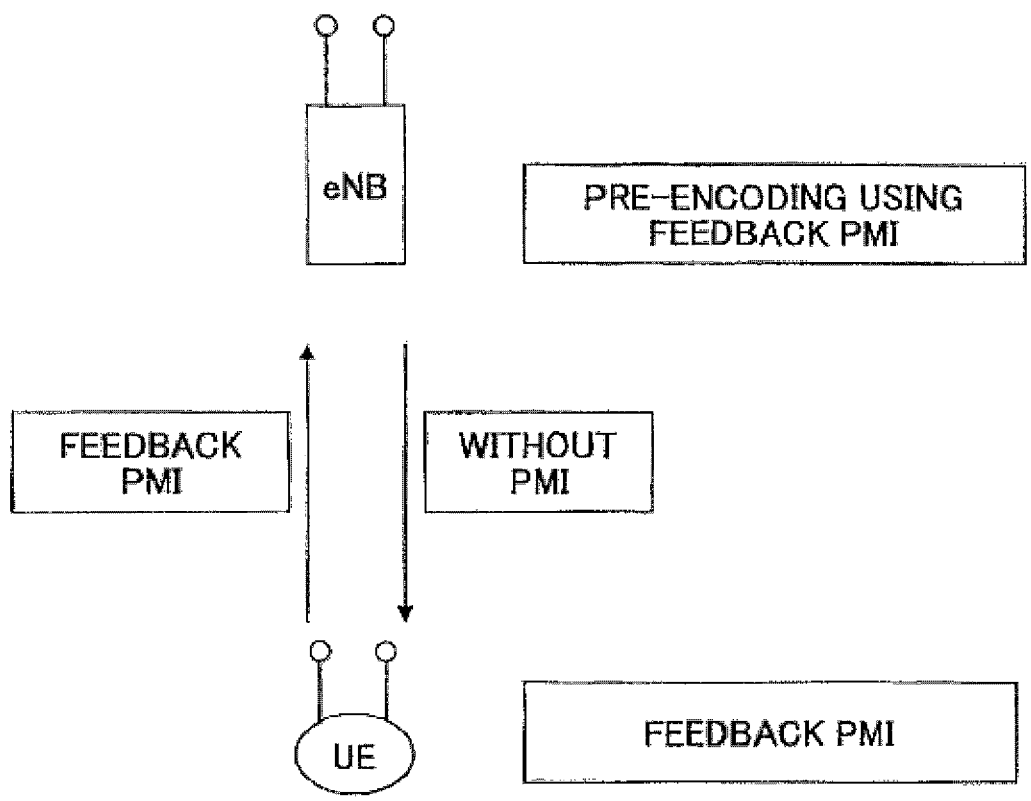
FIG. 4 is a view for explaining a conventional problem.

With a method for the base station apparatus to report the pre-encoding matrix each time to the user apparatus, there has been a concern, as described in conjunction with FIG. 3, about the signaling overhead becoming excessively large. There has also been a concern that the amount of information occupied by the PMI increases or decreases with the number of users multiplexed in downlink, so that a blind detection at the receiver is likely to become difficult.

In particular, when the system bandwidth is divided into multiple bandwidth regions, there has been a concern that the amount of information of the PMI increases by a factor of the number of bandwidth regions and it undergoes large fluctuations. With respect to these problems, when the number of users multiplexed to the PDCCH is less than a predetermined number N, the pre-encoding matrix may or may not be what is to be applied to the whole system bandwidth; but, when the number of users is no less than a predetermined number, the pre-encoding matrix may be arranged such that it has to be applied to the whole system bandwidth. With such an arrangement as described above, excessive signaling overhead may be avoided even when it is arranged for the PMI to be always included in the downlink signaling as shown in FIG. 3. Moreover, from the point of view of unifying the transmission format of signaling, when the number of users is no more than a predetermined number and when a pre-encoding matrix is specified for each bandwidth region, it may be arranged for the downlink signaling to not depend on the number of allocated resource blocks and for all of the pre-encoding matrices for the whole system bandwidth to be always signaled. This is advantageous in being able to narrow down to a selection of pre-encoding matrices, out of which either of two is selected, of whether the pre-encoding matrix is for the whole system bandwidth and to suppress the number of selections for blind detection.

As described above, while the present invention is described with reference to specific embodiments, the respective embodiments are merely exemplary, so that a skilled person will understand variations, modifications, alternatives, and replacements. How the embodiments or items are divided is not essential, so that a combination of matters may be recited in two or more embodiments or items. While specific numerical value examples are used to facilitate understanding of the present invention, such numerical values are merely examples, so that any appropriate value may be used unless specified otherwise. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2007-258109 filed Oct. 1, 2007, the entire contents of which are hereby incorporated by reference.

The invention claimed is:

1. A base station apparatus in a mobile communications system, comprising:
   a unit which transmits, to one or more user apparatuses, a downlink control signal including information for allocating a radio resource;
   a unit which receives an uplink signal from the one or more user apparatuses; and
   a unit which determines, based on a feedback from the user apparatus, a pre-encoding matrix indicator (PMI) indicating a pre-encoding matrix to be applied to multiple antennas of the base station apparatus, wherein, when a number of multiplexed users in the downlink control signal is no less than a predetermined number, the PMI indicating the pre-encoding matrix to be applied to a whole system bandwidth of the mobile communications system is reported to each of the user apparatuses, and wherein,
   when the number of multiplexed users in the downlink control signal is less than the predetermined number, a PMI indicating multiple pre-encoding matrices is provided for multiple bandwidth regions which constitute the system bandwidth of the mobile communications system.

2. The base station apparatus as claimed in claim 1, wherein the PMI indicating the multiple pre-encoding matrices provided for the multiple bandwidth regions indicates the pre-encoding matrix for the whole system bandwidth regardless of an amount of radio resource allocated to each of the user apparatuses.

3. A method used in a base station apparatus in a mobile communications system, comprising the steps of:
   transmitting, to one or more user apparatuses, a downlink control signal including information for allocating a radio resource;
   receiving an uplink signal from the one or more user apparatuses;
   determining, based on a feedback from the one or more user apparatuses, a pre-encoding matrix indicator (PMI) indicating a pre-encoding matrix to be applied to multiple antennas of the base station apparatus, wherein, when a number of multiplexed users in the downlink control signal is no less than a predetermined number, a PMI indicating the pre-encoding matrix to be applied to a whole system bandwidth of the mobile communications system is reported to each of the user apparatuses, and wherein,
   when the number of multiplexed users in the downlink control signal is less than the predetermined number, the PMI indicating multiple pre-encoding matrices is provided for multiple bandwidth regions which constitute a system bandwidth of the mobile communications system.

* * * * *